Patented Nov. 20, 1928.

1,692,040

UNITED STATES PATENT OFFICE.

HARVEY L. HULBURT, OF MONROVIA, CALIFORNIA, ASSIGNOR TO MURRAY CALIFORNIA FOOD PRODUCTS INC., OF AZUSA, CALIFORNIA, A CORPORATION OF CALIFORNIA.

DRIED MARMALADE AND PROCESS OF PRODUCING THE SAME.

No Drawing.　　Application filed September 20, 1926. Serial No. 136,730.

This invention relates to a dried marmalade and process of producing the same.

The methods of manufacturing marmalade commonly employed in the home require from two to three days. It is an object of the present invention to provide a product in dried form which can be utilized by boiling with water to produce marmalade in a few minutes.

Another object of the present invention is to provide a dried orange marmalade which preserves and protects the flavor in the ingredients indefinitely.

A further object of the present invention is to provide a dried marmalade which will preserve the natural coloring matter of the fruit, and is in a soft non-brittle form which can be packed in unsealed packages without danger of attack from moths, ants, or mold.

Various further objects and advantages of the present invention will appear from a description of an example of a preferred form of a process which embodies the invention. For this purpose, there is hereinafter set forth in considerable detail, an example of the process as it is carried out in the manufacture of orange marmalade. It is understood, however, that the process may be utilized in a similar manner for forming other marmalades, particularly from citrus fruits, such as lemons and grapefruit.

In the present process, the fruit to be processed is first preferably carefully washed. Parts of stems or hard parts are removed by hand, or otherwise. The outer peel including the white pith is then mechanically removed from the fruit. At this time, the pith is preferably left with the outer peel.

The separated peel is then treated with an alkali containing material, such as a salt solution or a solution of lime, for the purpose of softening the peel and also for destroying any undesirable mold or bacteria and prevent dark spots or other colored spots from developing on the finished product. Preferably, this is accomplished by repeatedly submerging the peel in a hot water bath containing 1 per cent by weight of freshly added unslaked lime. The temperature of the bath is preferably below the boiling point of water and most desirably at 180° F. The product is maintained in the solution only for a second or two and it is repeatedly dipped at intervals until it has become softened or made tender.

This treatment also has the advantage of expanding the cellular structure of the peel in excess of normal and in so doing, prepares the product for the subsequent treatment in that it facilitates the removal of the oil content and drying of the product. After the bath with the alkali containing material, the product is submerged in pure cold water to clean or wash away excess of lime or other alkali containing material such as salt, (sodium chlorid). The cold water treatment also operates to set the natural color in the peel so that the peel will not bleach or be affected by sunlight. The alkali washing operation may be eliminated when good, sound fruit is used.

After the cold water washing operation, the peel is then preferably comminuted in order to expose to a large degree the oil cells of the peel. Preferably in order to preserve the appearance of the product, this is accomplished by slicing the peel in very thin pieces, the slices being, for example, between 1/50 and 1/60 of an inch in thickness.

The sliced moist peel is then covered with an admixture of jellifying materials. Preferably the materials are in the dry state and are dusted upon the peel. An example of suitable jellifying materials is sugar, fruit pectin, and acid (an edible acid, such as citric acid). The powdered jellifying material comes in direct contact with the exposed oil cells and outer surface of the peel.

The dusted peel is then dried preferably at a temperature as low as possible and not in excess of 150° F. For this purpose, the dusted peel may, for example, be placed upon metallic screens and placed in a vacuum drier. Excessive heating should be avoided during the drying operation as otherwise the sugars present will oxidize and form a product having a dark color. Moreover, the pectin of the jellifying material will be decomposed. An excess of the dusting mixture is employed in order to insure ample mixture for future purposes. During the drying of the peel, the jellifying material partially reacts with the moisture of the peel and forms over the dried product a thin jelly film which operates to seal in the oil and flavor. The jelly film thus formed also preserves and protects the flavor ingredients indefinitely and prevents the peel from becoming brittle on long standing. The jelly film also prevents the oil of the peel from coming in contact with oxygen or other materials which would decompose the oil to objectionable turpenes. The excess dusting material, largely owing to its acid nature, makes the product practically mold, ant and moth proof.

The product may be packed within a further mixture of the jellifying materials with or without an air tight seal and samples of the material are found to keep for two years or longer without either absorbing or giving up water or otherwise deteriorating with age.

In use, marmalade is produced from the dried peel merely by placing the peel in water and boiling the same for a few moments. The peel thus dried quickly releases its flavor and color and expands to normal shape and size, producing a delicious product in a few minutes as compared with the two or three days now necessary in the manufacture of marmalade.

While the particular product and process herein described are well adapted to carry out the objects of the invention, it is understood that the invention is capable of numerous modifications and changes, and the invention, therefore, includes all such modifications and changes as come within the scope of the following appended claims.

I claim:

1. A process of producing dried marmalade, which comprises applying to fruit peel a dry admixture of jellifying ingredients, and then drying the peel.

2. A process of producing dried marmalade, which comprises applying an admixture of pectin, sugar and acid in a dry state to fruit peel, and then heating the peel to a temperature sufficient to dry the same and form a jelly film thereover.

3. A process of producing dried marmalade, which comprises cutting fruit peel into thin slices, covering the slices with jellifying ingredients in quantity sufficient to form a jellied marmalade upon subsequently treating the final product, and then heating the slices to dry the same and produce a jelly film thereover.

4. A process of producing dried marmalade, which comprises treating fruit peel with lime, thereafter covering the peel with jelly producing materials, and heating the peel to a temperature sufficient to dry the same to form a jelly film thereover.

5. A process of producing dried marmalade, which comprises submerging fruit peel in a hot solution of lime, then washing the peel, then dusting the peel with a dry admixture of sugar, pectin and acid, then heating the peel to a temperature sufficient to dry the same and produce a jelly film thereover.

6. A process of making dried marmalade which comprises immersing fruit peel in a hot solution of lime, washing the peel, then slicing the peel into narrow strips, dusting the peel with a dry jellifying admixture of sugar, pectin and acid, and heating the peel to a temperature sufficient to dry the same and form a jelly film thereover.

7. A process of producing dried marmalade which comprises subjecting fruit peel to a bath of lime, then immersing the peel into a cold water bath, slicing the peel into thin strips, dusting the peel with a dry admixture of pectin, sugar and acid, and heating the peel to a temperature sufficient to dry the same and produce a jelly coating thereover.

8. A marmalade base comprising substantially dry sliced fruit peels coated with jellifying ingredients in quantity sufficient to form a jelly-like body when the base is treated with water.

9. A marmalade base comprising substantially dry sliced fruit peels coated with a jelly film of pectin and acid in quantity sufficient to form a jelly-like body when the base is treated with water.

10. A marmalade base comprising substantially dry sliced citrus fruit peels containing natural oils and coated with jellifying ingredients in quantity sufficient to form a jelly-like body when the marmalade base is heated with added water.

Signed at Monrovia, Cal., this 6th day of September, 1926.

HARVEY L. HULBURT.